United States Patent [19]

Henshaw et al.

[11] Patent Number: 5,485,174

[45] Date of Patent: Jan. 16, 1996

[54] DISPLAY IMAGE SCROLL CONTROL AND METHOD

[75] Inventors: Susan F. Henshaw, Raleigh; Sarah D. Redpath, Cary, both of N.C.

[73] Assignee: International Business Machines Corporation, Armonk, N.Y.

[21] Appl. No.: 973,929

[22] Filed: Nov. 12, 1992

Related U.S. Application Data

[63] Continuation of Ser. No. 636,655, Dec. 31, 1990, abandoned.

[51] Int. Cl.⁶ ..................................................... G09G 5/34
[52] U.S. Cl. ........................... 345/123; 345/115; 345/127
[58] Field of Search .................................... 345/115, 119, 345/120, 123, 127, 129, 130; 395/156, 157

[56] References Cited

U.S. PATENT DOCUMENTS

| | | | |
|---|---|---|---|
| 4,786,897 | 11/1988 | Takanashi et al. | 340/721 |
| 4,823,303 | 4/1989 | Terasawa | 340/724 |
| 4,831,556 | 5/1989 | Oono | 340/723 |
| 5,187,776 | 2/1993 | Yanker | 395/157 |

FOREIGN PATENT DOCUMENTS

| | | | |
|---|---|---|---|
| 0200393 | 8/1989 | Japan | 340/727 |

OTHER PUBLICATIONS

"Microsoft OS/2 Programmer's Reference, vol. 1", Microsoft Corp. 1989, Cover & Title Page, Notices, pp. 54–75, 96, 178, 392–423.

"Microsoft OS/2 Programmer's Reference, vol. 2", Microsoft Corp. 1989, Cover & Title Page, Notices, pp. 55–57, 196–197, 332, 419–420, 424–425, 439, 444, 466.

Primary Examiner—Ulysses Weldon
Assistant Examiner—Matthew Luu
Attorney, Agent, or Firm—Edward H. Duffield

[57] ABSTRACT

Scrolling of work objects displayed on a computer display screen is controlled by a control element window displayed simultaneously on the display screen with the work area which is to be scrolled. A reduced size representation of the overall dimensions of the work object with the work area viewing portion of reduced size superimposed over it are displayed in a second window or display area on the screen. Cursor selection or movement of the reduced size representation of the work area within the representation of the overall work object by cursor selection and dragging or by activation of incremental scrolling or directional scrolling buttons displayed within the second display area, controls the portion of the overall work object displayed within the first display area.

12 Claims, 9 Drawing Sheets

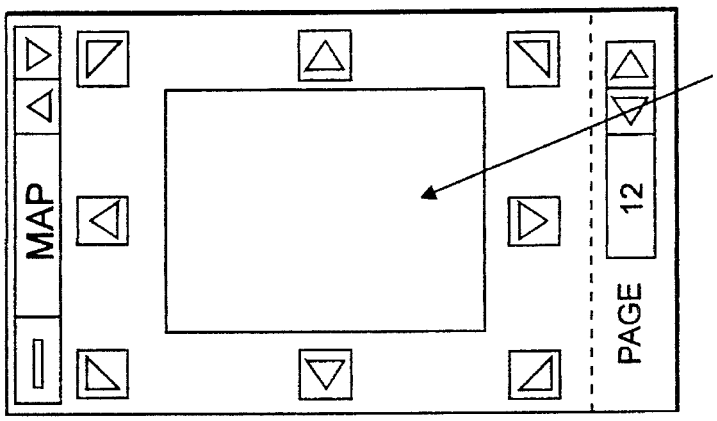
FIG. 8C
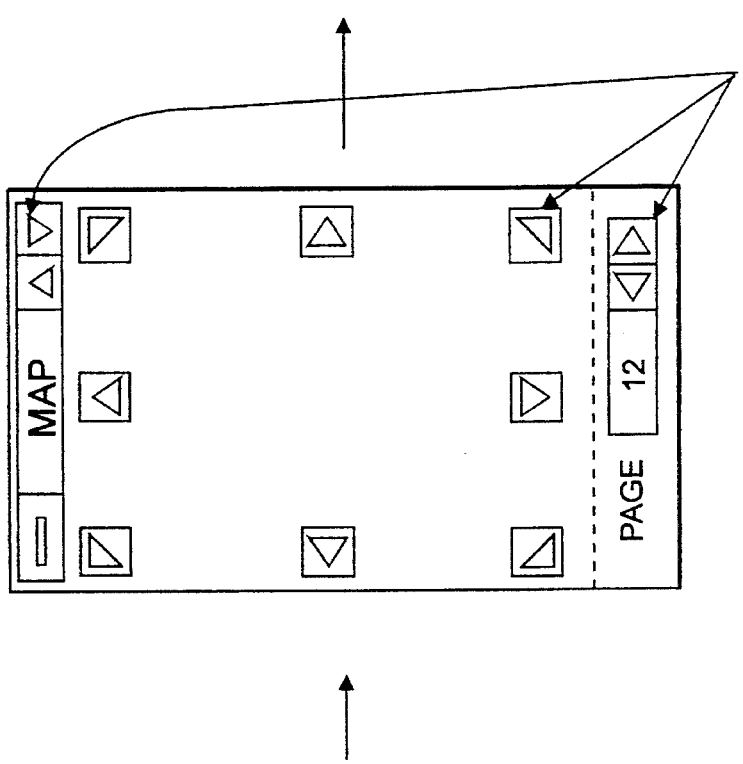
FIG. 8B
FIG. 8A

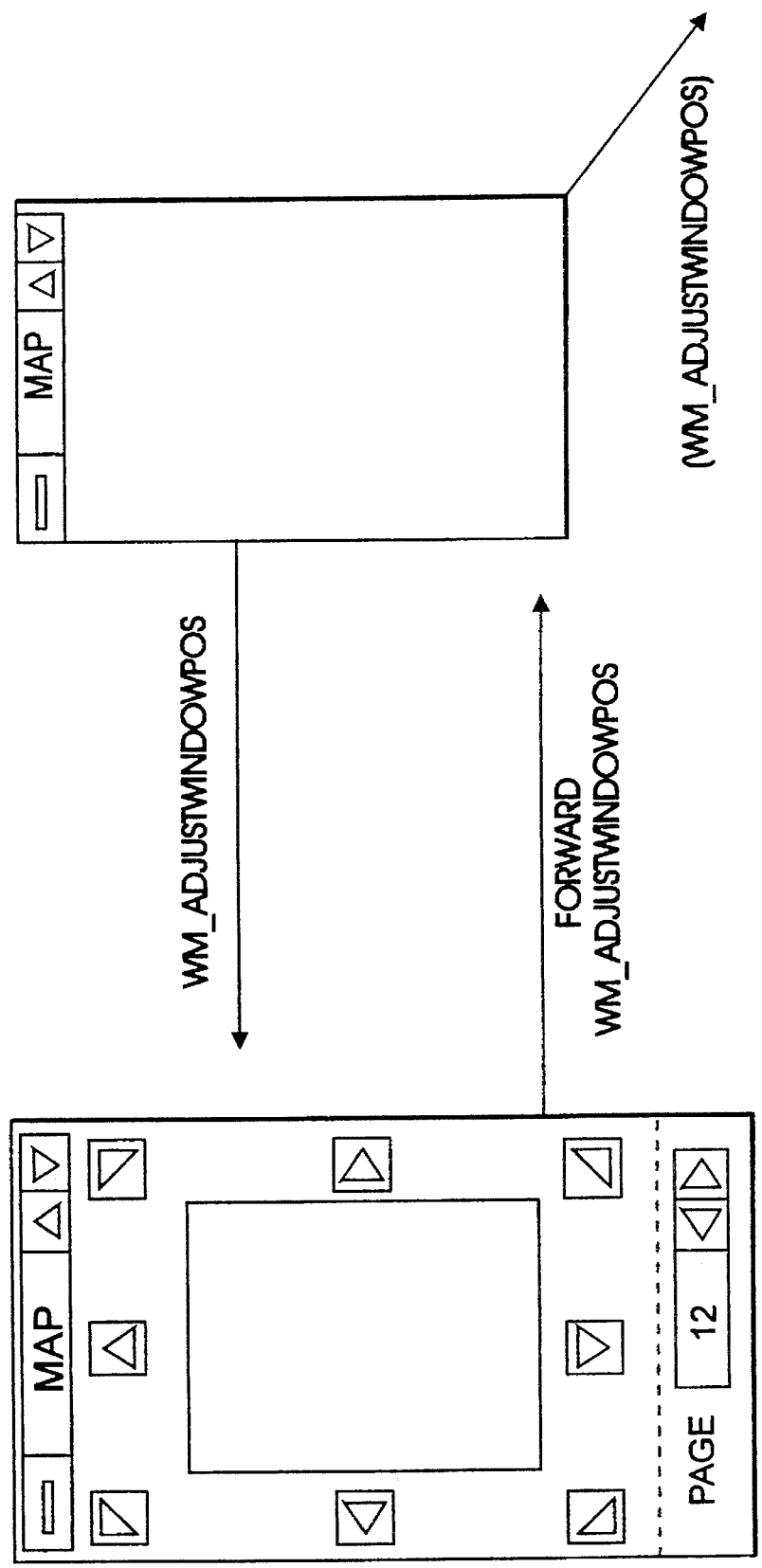

DISPLAY IMAGE SCROLL CONTROL AND METHOD

This is a continuation of application Ser. No. 07/636,655 filed Dec. 31, 1990, and now abandoned.

FIELD OF THE INVENTION

This invention relates to computer displays and computer controlled display systems in general and more particularly to scrolling controls for images displayed on display devices in such systems.

PRIOR ART

Computer display systems are widely known and used. Nearly every computer system from small, lap top devices and medium sized home use personal computers as well as large, mainframe driven terminals with enormous processing power available to them all include at least one display device for displaying to a user information regarding their current work object or other information. In all of these systems, it is common today to implement controls over what is presented on the face of the display means. The controls may take the form of a joystick, a mouse, keyboard direction key controls and the like. One of the most common control techniques is to utilize the computer system's display cursor as an indicator that may be mapped to features displayed on the screen of the display device on which the cursor may be superimposed. Selection of one of the displayed control elements or areas on the screen of the display device is achieved by moving the cursor via the usual cursor move keys, mouse controls, joystick or the like to the desired location where the cursor is superimposed over the desired control function and then pressing an enter or activate key or its equivalent (mouse button or the like). This action signifies to the computer system that the displayed control function over which the cursor is currently positioned has been chosen for activation. The mechanism and methods of operation which achieve selection of a desired indicated control function from the screen of a display means in a computer system are well known and any of a variety of them are generally familiar to computer system users.

One of the chief difficulties with the known prior art display systems is that the screen or face of the display means itself is usually smaller in physical size than actual documents, for example, that may be a work object for a given computer system user. This necessitates either reducing the size of characters or other images so that the entire document fits on the display screen, an approach that has many undesirable features in terms of visibility and readability, or of displaying only a portion of the document or work object which is currently being operated upon which is the usual course adopted. This, in turn, introduces a new problem: only a portion of the work object being worked upon may actually be seen on the display system at any one time. This necessitates the use of "scrolling" operations by which the area of the work object which is displayed on the display means may be effectively "moved" or relocated to exhibit a different portion of the work object. This has the effect of moving the viewpoint or window that may be imaginarily superimposed over the work object and representing therein the area of the work object which may be displayed on the screen of the display device at any one time. Scrolling controls to translate the image left or right, up or down are commonplace. These controls, however, are awkward, cumbersome and difficult to use in many situations.

Most computer system user display interfaces in common use today use "scroll bars" to permit the user to change the portion of the current work object that can be seen within the "window" area of the screen. The scroll bars are control areas on the computer display screen in itself that can be selected with a cursor that is moved by cursor movement keys, by a mouse, or by a joystick or the like and which are invoked by pressing the enter key or select key once the cursor is positioned over the desired function which is to be selected. This type of scroll mechanism and control method is not easily accessed, flexible, nor does it provide a clear feedback to the user of where the work object boundaries may exist with respect to the portion of the work object currently displayed. Additionally, this mechanism only permits horizontal or vertical scrolling; it has an awkward and inefficient interface in the form of the displayed control scrolling bars that absorb or occupy valuable screen "real estate". This mechanism does not communicate in any effective way what relationship may exist between the work object's actual total size to that portion of it that is visible within the window of the display screen.

OBJECTS OF THE INVENTION

In view of the foregoing known difficulties with the prior art, as well as numerous others that will be described later, it is an object of this invention to provide an improved computer display scrolling mechanism.

Yet another object of the present invention is to provide an improved computer display screen scrolling control mechanism.

The foregoing and still other objects that have not been specifically enumerated will be illustrated with respect to a preferred embodiment and described herein and briefly described as follows:

BRIEF SUMMARY

The improved scrolling method and apparatus of the present invention utilizes an improved scrolling control area displayed on the screen of the display device. The scrolling control area appears to the computer user as a small, visual map or representation displayed within a control area or window of the display screen itself. The visual map appears to the user as if the entire work object, which is not visible on the screen of the display, were viewed from afar. The visible map shows the overall area outline of the work object and also shows, with an inner outline placed within the overall outline, a representation of that area of the work object that is currently visible within the work space window on the display screen of the system. Thus, the user is provided with a visual representation of the overall work object including those portions not currently visible on the display screen as well as on illustration of the relative size of the window or work area in relationship to the overall relative size of the work object, its placement and the margins that may exist. The four corners and the four sides of the visual representation of the control area offer control element areas in the form of "buttons" implemented as any other functional control area to be selected by a cursor, touch on a touch screen or the like. The "buttons" are implemented in a fashion similar to the well known scroll control bars and may be activated by a user selecting them with a mouse, cursor motion control keys, joystick or the like. Buttons on the four sides of the visual representation map control the horizontal and vertical implemental scrolling of the portion of the work object displayed within the work area window.

Additional buttons at the corners of the visual control representation area allow scrolling in 45 degree diagonal directions as well. The entire control element area is itself a miniature map display surrounded by a small window border within which various control buttons are arrayed around the periphery of the map. A window icon is also provided to allow a user to implement "move" and "close" choices for the map control element or other window functions.

Inside the control element's area map, there is displayed a highlighted rectangle representing the current portion of the user's work object in view within the work area on the computer display screen. Any areas of data to be selected which lie outside of the current viewing window are also indicated by the overall borders of the control element map display portion. Button controls arrayed around the periphery of this latter portion of the display implement orthogonal or diagonal scrolling of the view; they may also show the current page of the work object being worked upon as well as page incrementing or "spin" button controls. An entry field is also provided in some instances to allow the user to enter instructions into the control area. The highlighted rectangle representing the user's work object portion that is currently in view, as shown on the visual map control element, may also be selected by the mouse or cursor and "dragged" anywhere within the overall map area to automatically change the portion of the work in view, i.e. to "scroll" to that portion of the work object which is selected by the relative movement of the highlighted rectangle in the map area.

The objectives and functions of the present invention as implemented in a preferred embodiment of the mechanism and method will be further described in relation to drawings depicting a preferred embodiment in which:

BRIEF DESCRIPTION OF DRAWINGS

FIGS. 8A–E pictorially illustrates the steps taken to create the control element area as seen on the display screen of the computer system.

DESCRIPTION OF PREFERRED EMBODIMENT

In order to appreciate the present invention, it is necessary to fully understand the difficulties with the known prior art in somewhat greater detail.

Figure 3A:
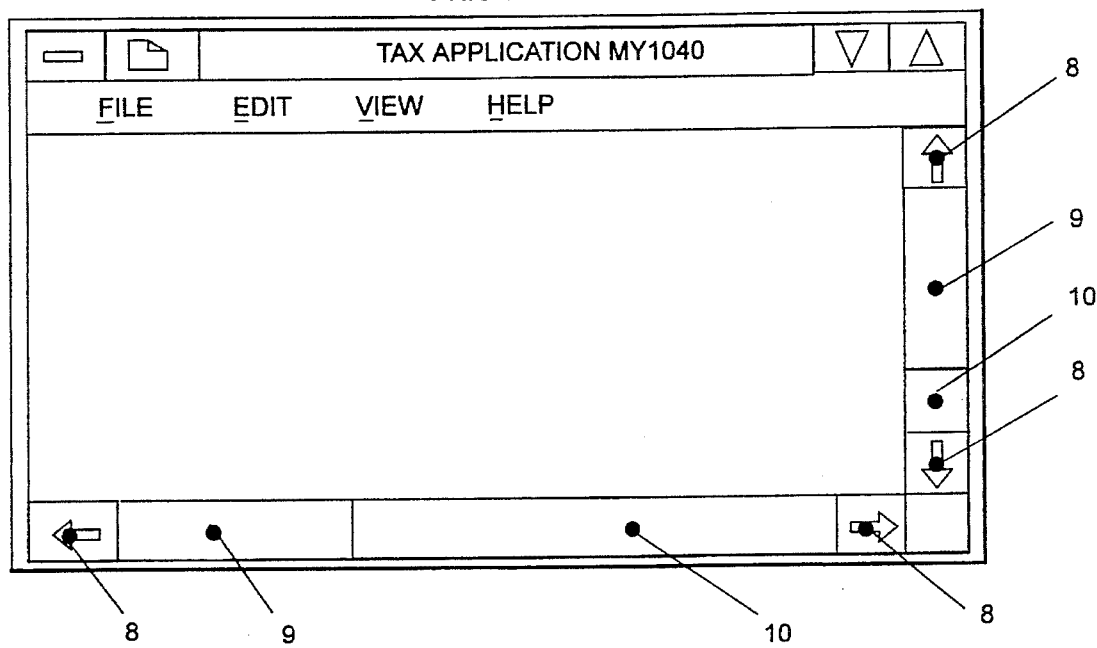
FIG. 3A and 3B illustrate alternative prior art scrolling control elements.
Figure 3B:
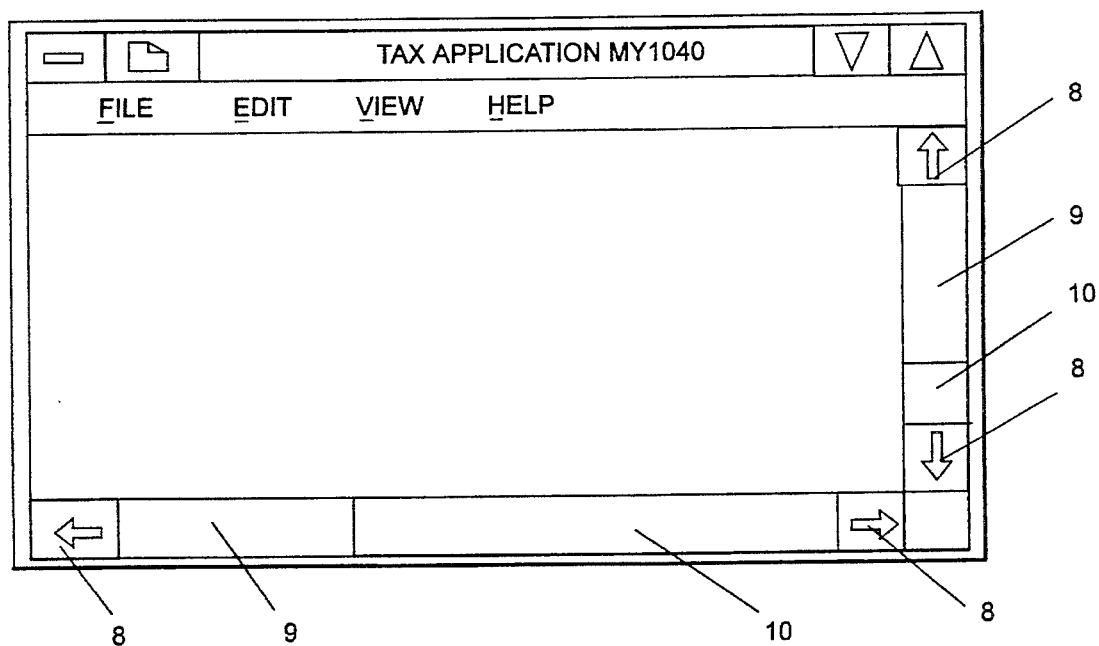

Turning to FIGS. 3A and 3B, typical prior art scrolling control elements are presented in the form of scroll bars. Scroll bars are auxiliary display areas surrounding the user's work area or work window on the face of a display screen. They may be presented either vertically, horizontally or, as is usual, both vertically and horizontally simultaneously. When present, the scroll bar controls usually align with the rightmost and bottommost interior edges of the work object display area or work window that the user perceives. They extend across the width of the work area and vertically along the edge of the work area. The scroll areas consist of three parts as usually implemented. There is a scroll button, a scroll box and a scroll shaft or axis.

A scroll button is depicted as 8 in FIG. 3A and 3B, and several of each are implemented to control vertical and horizontal scrolling. The scroll box is depicted as 9 and the axis or shaft as 10. The scroll box 9 visually moves from one end to the other of the scroll shaft or axis 10 as the relative position indicator for what is being displayed from the overall work object.

The scroll box 9 in some systems may represent instead the proportion of the work object that is currently visible in either the horizontal or vertical directions. This is shown in FIG. 3B where the scroll box increases in length or decreases according to whether scrolling in the horizontal or vertical direction is invoked by the control buttons 8. This type of control box indicator serves in a manner similar to a bar graph, a thermometer or the like to represent to the user an analog of the actual position of the user's work area within the overall, unseen outlines of the work object.

In the usual system, the scroll box 9 remains the same size, but moves along the scroll shaft or axis 10 in response to activation of one of the control buttons 8 located at each end of the scroll shaft or axis 10. By user selection of the scroll button 8 at the top of the vertical scroll control 9 in FIG. 3A, the user is directing the system to scroll the view upward without moving it horizontally to the left or right. The scroll box 9 will move up the scroll shaft or axis 10 in response to activation of the topmost control button 8.

In the prior art system shown in FIGS. 3A and 3B, the scroll buttons 8 control the incremental movement of the scroll box 9 in the direction indicated by the placement of the scroll buttons 8. This, in turn, scrolls the view of the work object displayed on the screen in the user's work area by one increment in a similar direction. To shift an entire page in a particular direction, the user must first select the desired scroll shaft 10 from the scroll box 9. The user may also be required to reposition the control box 9. To do so, the user must "pick up" the scroll box 9 by selecting it with the cursor and then moving via mouse, joystick or the like, the cursor pointer to drag the scroll box 9 by moving the mouse or other cursor control element to the desired new position along the axis or shaft 10. This must all be accomplished while the cursor or pointer is kept within the bounds of the scroll shaft 10, since moving the indicator outside of the shaft causes the scroll box 9 to revert to its original location.

This is a physically demanding task, particularly on small display screens. Extensive and physically precise cursor control excursions are required to incrementally scroll a view on a work object in the different directions. To scroll by an increment of 45 degrees, the cursor or pointer must traverse the entire diagonal length of the work object's viewing or display window, even a more difficult task. It is physically somewhat cumbersome to scroll the view of a work object by more than a single increment since the user will not easily grasp the concept that scrolling by a large increment requires one to select within the scroll bar 10 a relative location somewhere in the desired direction. There is a great deal of inconsistency in implementations of the prior art so users are never quite certain how much scrolling will be the equivalent to moving by a page or some normal portion of a page. Scrolling by a full display window full minus a line or increment for reference is usually accomplished by selecting within the scroll bar 10 at a relative position in the desired direction, but this requires coordination with the relative position scroll controls 8 and a good mental image of what the actual work object looks like in order to accurately position by more than a few lines for a new view on a new page.

Additionally, users have a difficult task relating the scroll box position and concept to the physical data of the actual work object. In systems where the scroll box 9 remains a fixed size, there is no indication as to the overall work object's size with respect to the work area of the viewing work window. Even when the scroll box 9 has size that varies as in FIG. 3B, many users cannot accurately determine the size of the actual work object in relation to the size of the display work window for it. In all cases, the user must form a mental image of the actual data object and its relative size with respect to the work area display window by combining the information present in the scroll bars with their mental image of the actual extent and content of the work object.

Additionally, there is no mechanism in the prior art, other than via the mode of dragging the scroll box 9, to quickly relocate to a desired point in the work object view window. The prior art mechanism only permits a user to change to a fixed reference point in the horizontal or vertical plane in a single step and then only if the user has remembered how that particular selected spot will relate to the view of the real work object.

At or near the boundaries of the work object itself, the scroll bar implementations of the prior art fail conceptually. Scrolling to the end or to the edge of a work object presents the user with no more data past that point. Many implementations simply do not allow a user to scroll the viewing window contents beyond the point where the last line of the work object comes into view at the bottom or any of the other three borders. This does not allow the user to create a "blank area or white space" in which to easily add additional information or data to the work object.

This mechanism also fails conceptually when the object, as is typical, is physically much larger than the display window area in which the portion being worked upon is being presented.

Another alternative prior approach is to vary the size of the scroll box 9 as shown in FIG. 3B to indicate, in a fairly accurate analog form, the relative percentage of the work object physical dimensions that may be seen within the viewing window for the present view. This will not match the user's expectation whenever the scroll box has scrolled beyond the limits of the current view area and thereby represents a portion of the object that is not usually in view.

Still another alternative is to build "white space" into each work object scroll bar controls. However, this white space control may surround the working object at the margins of its dimensions that can be reached by scrolling and scrolling into this area can be misleading since the work object will seem larger than it actually is. Of the three alternatives given, the latter is conceptually the least disruptive to the user but is quite unsatisfactory as will be appreciated from the foregoing.

Additionally, scroll control bars on the work object display area occupy valuable viewing "real estate" that can be much better utilized for the work object display itself. The scroll bars can only accommodate rectangular work objects as well since they will force the addition of blank space or enforced rectangular display outlines on work objects which may not naturally conform to such a shape. Additionally, on touch control operated viewing screens which are fairly common today, the controlling of scrolls may be easily overlooked or physically missed by a user's finger or pointing stylus. The result is often that the user becomes frustrated since unintended scrolling actions will occur when the users touch the scroll bar shaft and cause page scrolling rather than touching scroll buttons to incrementally scroll the display. Also, in multiwindowing applications, it is unfortunately easy to touch portions of other windows, thereby causing them to jump to the forefront in the active work display area and receive all input. Finally, physical actions performed are not easily reversible with mouse or cursor control devices. In general, the opposite action controls on the screen are located at widely separated locations from one another. This makes fine tuning and small adjustments physically difficult and mouse motion or cursor motion intensive.

In view of all of the foregoing problems, the present invention provides a greatly improved control means and method of scroll control or other functional control operation. The scrolling control element map of the present invention provides a control interface that enhances the user's conceptual model of how the data being worked upon should appear in the viewing work area on the screen. It provides the user with flexibility to view any portion of the overall work object data very quickly without directional limitations. A clear, graphical representation of the current view of the actual work object with respect to its full physical dimensions is provided in a user informative fashion. Numerical feedback may also be supplied if desired.

Figure 1:
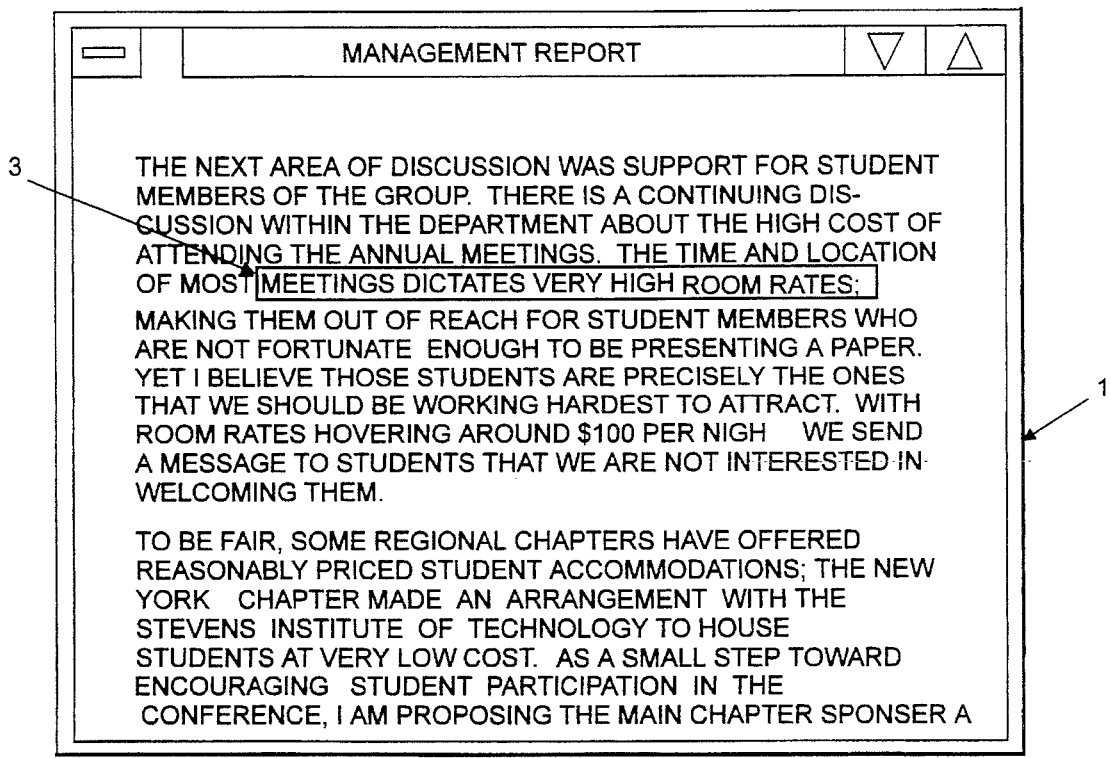
FIG. 1 illustrates a representation of a display screen having a typical user's work object portion displayed upon it with an indication for the work area involved on that work object.
Figure 2A:
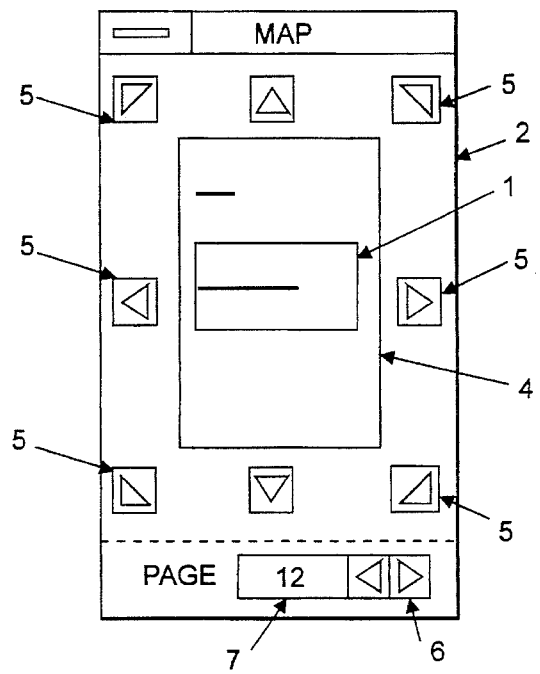
FIGS. 2A, 2B and 2C illustrate several preferred alternatives of the scroll map control element of the preferred embodiment.
Figure 2B:
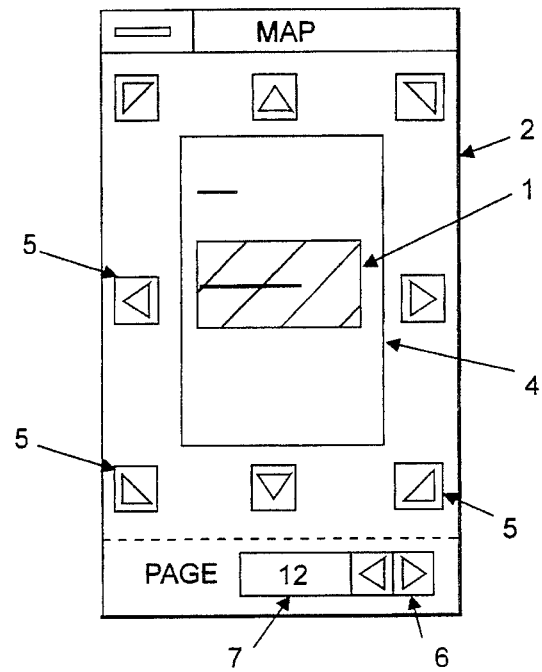
Figure 2C:
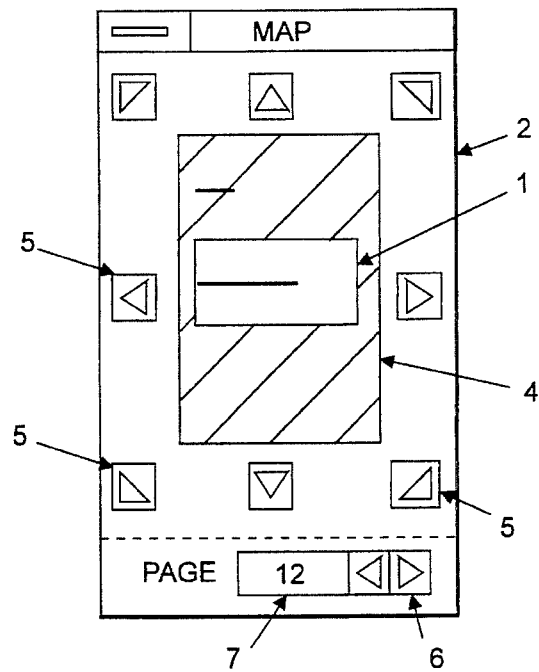

Turning to FIGS. 1 and 2, a representation of the preferred embodiment is shown. The usual viewing window work area is shown as 1 while the active work zone within the work area is shown by the highlighted zone 3 positioned within the window 1. On another area of the screen, the improved visual map control element of the present invention is shown as map 2. Several variations are shown in FIG. 2A through 2C. In FIGS. 2A through 2C similar numerals depict similar elements.

The user's work window frame 1 is depicted in miniature within the control element 2 as a border, outline, shaded or reverse shaded area as depicted respectively in FIGS. 2A through 2C. The overall dimensions or outline of a work object are depicted by the highlighted area 4 which may be shaded or reverse highlighted with respect to the work area representation 1.

Area 4 is also a miniature representation, but of the entire work object's relative dimensions with respect to the work window area 1.

Individual scroll direction control buttons are shown as 5 in FIGS. 2A through 2C. These may be selected by finger or stylus touch on a touch controlled cursor screen interface or by moving the cursor in cursor control screen interfaces to the desired button area and pushing the select or enter key.

At this point, it may be well to mention that the specific physical mechanisms and controls for cursors or touch screens do not form a part of the present invention, but these are utilized by the preferred embodiment in a manner in which scroll control bars and other control elements displayed on a screen in the prior art have long been utilized. The improvement of the present invention resides in the control area element itself as displayed on the screen and in its relation to the control functions with respect to the area of the work object displayed on the screen.

The improved control element of the present invention appears as a scrolling map in a secondary display and control window on the face of the computer display. Commonly available windowing programs offer the capability of creating these subwindows, giving them title information, icons, sizing of a border and for implementing control buttons or functions within them as will be described later. In FIGS. 2A through 2C, a title bar at the top of the control area window identifies the name of the user's originating work object or the window within which it appears. A sizing border permits the user to change the size of the secondary display window within which the control element map appears. The size of this window is not ratio dependent on the original object window. However, in the preferred embodiment, the largest possible map image of the original work object appears in this secondary display and control window so that no scrolling is ever needed to perceive the entire map of the original object even though the original object is not all visible in a viewing window. The ratio of the displayed work portion of the original object to the size of the original object is maintained. The interior of the scroll map control element window may be a darker shade than the map itself such as shown in FIG. 2B to make it easier to discern the extent of the work object outline 4 in FIGS. 2B, 2A and 2C. The map of the currently displayed work area and its relationship to the overall work object appears overlaid over the shaded work object element portion 4 as the viewing area portion 1 in the figures.

Therefore, all aspects of the windowing map match as closely as possible the original object as if it were seen, in total, from a distance with the work window area superimposed over a portion of it. All of the selection markings and colors as used on the original work object are reflected in the reduced size map. The map is displayed as distinctive rectangle either with different coloring or shading on the rectangle of the work object as shown in FIG. 2B, or simply a rectangle representing the window as shown in 2A, or with the background shaded and the work area window represented in a different color as shown in FIG. 2C. The map control area represents the current view of the working object relative to the entire object's dimensions. It shows both the location and the relative extent of the overall work object and the viewing or work area relative to that of the total object itself.

Positioned within the window border are shown a plurality of scrolling control button zones 5 in FIGS. 2 through 2C. Additionally, spin controls, which are paging buttons for horizontal paging or for vertical paging, are also shown as buttons 6 and a page indicator 7.

Figure 4A:
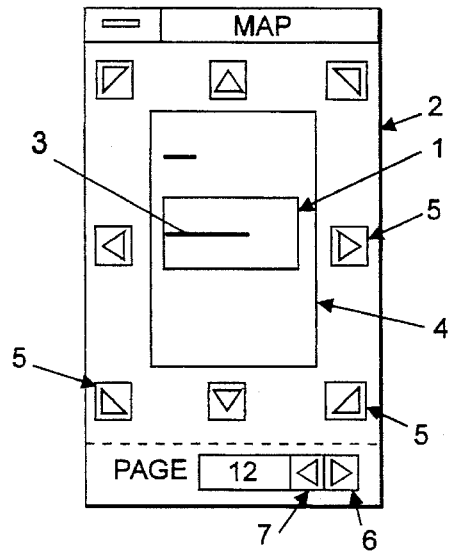
FIGS. 4A, 4B and 4C illustrate in greater detail the scroll map control element with control buttons, overall outline of work object and outline of work area as well as highlighted work zone within the work area.
Figure 4B:
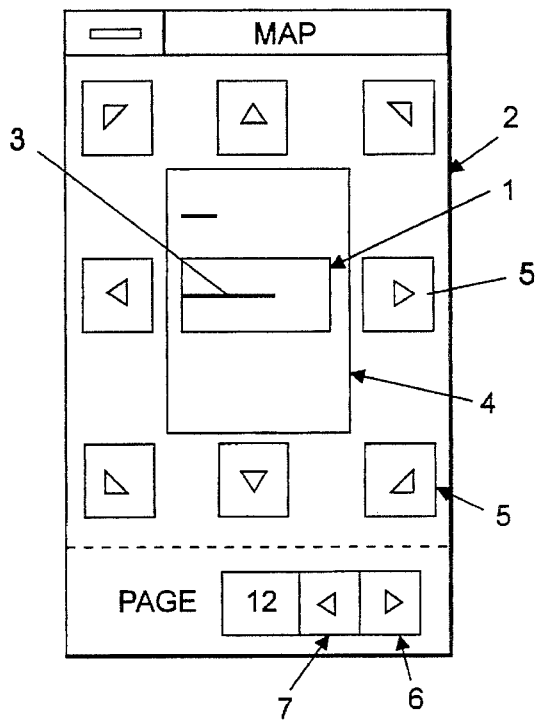
Figure 4C:
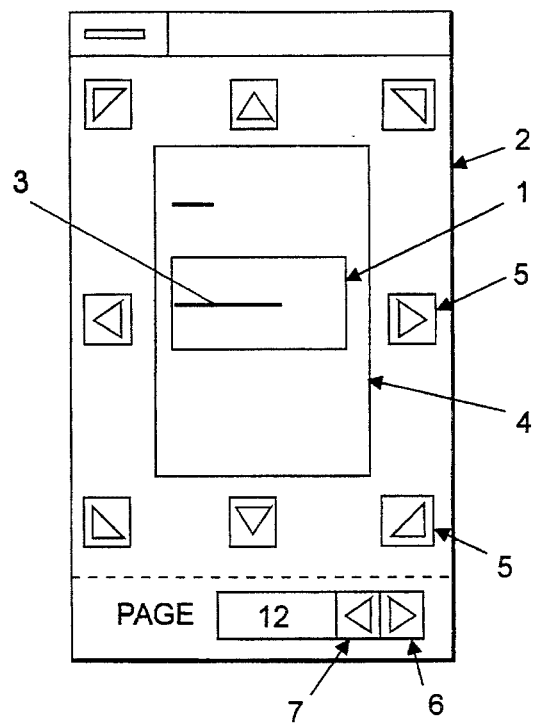

FIGS. 4A through 4C illustrate variations of the control element map area according to the format of FIG. 2A, but showing how the various scrolling control buttons may be displayed within borders of larger or smaller width and how the overall map control element itself may be increased in size if desired for finger touch operated screens. In FIG. 4B buttons of larger size within a wider border surrounding the overall work object representation 4 appear within the frame of the control window 2 as depicted. In FIG. 4C the overall control window 2 is of increased size relative to those in FIGS. 4A and 4B which facilitates finger touch actuation on touch screen controlled cursor entry indicator devices.

As shown in FIGS. 4A through 4C and 2A through 2C, the edges or borders of the control element map window in the preferred embodiment have eight incremental scroll control buttons 5. These buttons provide scrolling at each of the orthogonal and 45 degree directions relative to the work object's orientation. These scrolling actions may be performed manually by using a view area motion control implemented by a mouse or other cursor control to pick up and drag the work area representation 1 up, down or diagonally across the object representation 4 within the map control area. This produces similar relocation of the actual viewing area relative to the actual work object as displayed in the work object viewing window.

Alternatively, the control buttons 5 may be used to incrementally move the viewing area within the borders of the overall object map and thereby produce, as these changes in relative positioning of the work area representation and the overall work object representation change, communication to the computer display control which repositions the portion of the work object displayed in a display window in the same fashion as it does for the normal prior art scroll controlling bars. The buttons and/or the ability to drag the representation of the viewing window area within the borders of the overall object representation 4 in these figures represent distinct improvements in visualizing the actual relative location of the viewing window to the object's dimensions and facilitate much easier scrolling within the work object.

To accommodate for various user preferences, the buttons 5 may be made to appear in any of several sizes with small ones being used for precise mouse cursor control selection movements and the larger ones for touch screen users.

In operation, a user can, utilizing a normal mouse cursor control, "drag" the view window work area representation 1 anywhere within the overall work object representation 4 to reposition the outline view of the working area on the overall work object. Changes in these portions of the control map element are communicated to the display control program and interpreted as scrolling commands in the same fashion in which prior art devices utilized the scroll bar and button controls. A user may also incrementally scroll or page through the displayed work portion using the appropriate scroll buttons 5 in the border surrounding the control map elements as shown in FIGS. 2 and 4.

In short, the user can easily move the working area view location on the work object representation in a natural manner best suited to the type of scrolling and desired result which they wish to perform.

Significantly reduced mouse or cursor movement is required utilizing the improved control element scrolling map implementation of the preferred embodiment. This is true because the controls are conveniently grouped together with a limited area represented by the control element scroll map 2 in the figures. This requires only minimal mouse or cursor control movement or finger movement if a touch screen is being used. The eight directional scrolling controls provide for orthogonal and 45 degree scrolling which eliminates diagonal motion of cursor controls experienced in the prior art.

The problem of conceptually visualizing where, within the work object's overall dimensions a working area view is currently positioned, or what scrolling command actions will produce is no longer a problem in the preferred embodiment since these actions may be directly and graphically viewed in the map control element.

The user can instantly cause a jump in motion to any point represented on the overall outline of the work object simply by clicking his mouse or other cursor control element at the desired point. Dragging the working view representation to any desired location is also possible as pointed out earlier. This permits a user a wide range of choices among various forms of scrolling based on whichever form is preferable for the specific task at hand.

The compact rectangular design of the map control element occupies a minimal amount of screen real estate but it can be expanded at the user's option to occupy more area or even minimized, such as by icon control, when it is not desired for use.

The design of the preferred embodiment provides for work objects of any actual physical size and shape, since the dimensional outline representations 4 as shown in the map control area may be suitably reduced and represented in whatever form the actual work object exists. The work object representation 4 in FIGS. 2 and 4 is a geometrically reduced and geometrically similar form to the overall dimension of the actual work object.

A specific preferred embodiment of the present invention has been attained utilizing an existing product of the Microsoft Corporation known as Microsoft Operating System/2, also called Presentation Manager functions. This product is commercially available and has been described in detail in the "Microsoft OS/2 Programmers Reference", Volumes 1 and 2, copyright Microsoft Corporation, 1989, Document No. LN0702A-110-R00-0289. The specific preferred embodiment that has been constructed is based on the OS/2 operating system and includes all of the operating system function and calls, such as the spin buttons for page scrolling and the like. However, equivalent functions do exist in a variety of other products which may equally well implement preferred embodiments of this invention. For full details of a working windowing program which enables construction of the control element map area window, control buttons and scrolling functions as in the preferred embodiment described may be had from above mentioned "Microsoft OS/2 Programmer's Reference", Volumes 1 and 2. Since this is well known and has been commercially available for sometime, further description of that system which enables the computer display to be controlled from windows created on the face of the display will not be given. Instead, a preferred embodiment constructed utilizing such a system will be described in detail.

Figure 7:
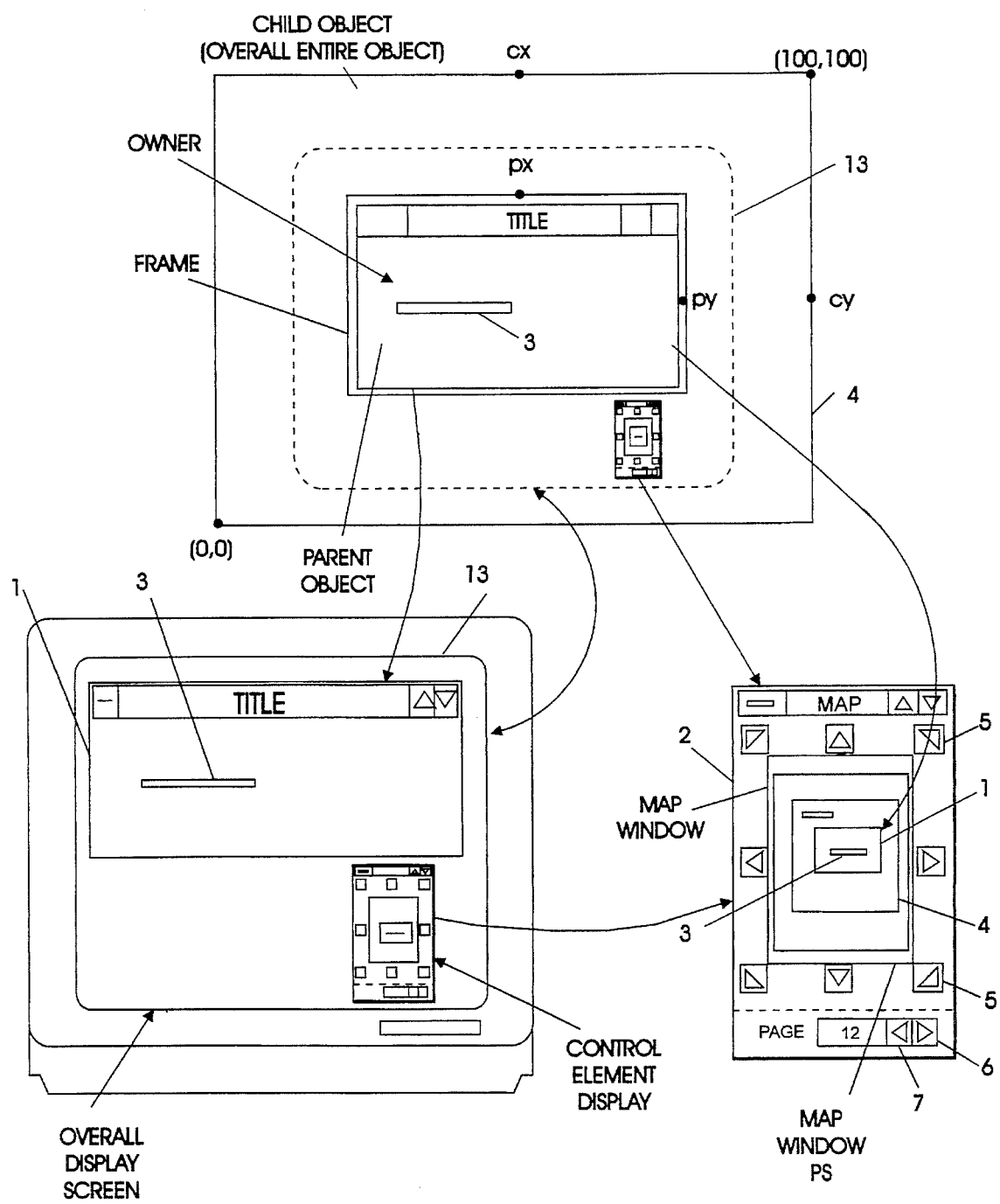
FIG. 7 illustrates in semi-pictorial fashion the relationship of the scroll map control element display in conjunction with a computer display screen having a user's work object viewing window and the scrolling control map area displayed upon it, both of which are shown in relationship to a hypothetical overall work object of physical size that is larger.

Turning to FIG. 7, some nomenclature that is appropriate to the OS/2 environment utilized in the preferred embodiment will be described. The overall work object is termed the "child" object in this existing system. Portions of the child object may be seen through the work area viewing window which is termed the "parent" object. The parent object is known as the "owner" of that portion of the work object which appears within the "frame" which is the border of the parent object window, i.e. the display window in which the working area of the work object in question is displayed by the system.

Superimposed over the view in FIG. 7 of the overall work object 4 is the dotted line representation for the relative size of the outline of the computer display screen 13 in this example. A control element map window 2 in the preferred embodiment of the invention is a secondary window operated and generated by the OS/2 program on the child object. The child object, in terms of an element in the system, is an object that is not visible on the work object view portion of the screen 1. Within the map window 2 is defined another separate window that is the map window's presentation space within which the outline of the overall child object and the parent object may be positioned. The controls in a windowing program for creating and moving windows relative to one another are well known and will not be described further except for the procedures adopted for utilizing these functions to construct the preferred embodiment.

The first step for producing an embodiment of the control map element 2 of the invention requires recognition by a using program, such as a window control program, of the control element or maps existence. This requires creation or definition of a window to contain it, such as implemented in the following steps for a system utilizing the aforementioned OS/2 program.

The first step is to register the procedure "MapRegister" with its hab, frame and owner parameter values. This performs the following steps as shown graphically in FIG. 8 and schematically via instruction functional steps in FIG. 6. In FIG. 8, first a map window must be specified which the registration procedure just noted performs by the following chain of events:

I. The first step for any embodiment of the control element scroll map of the invention requires recognition by a using program of the control element map's existence, such as via the following steps for implementing a control element display window using the aforementioned MS OS/2 program reference. The instructions to be entered into a program are given below.

1. Register the procedure "MapRegister" (hab, frame, owner) which performs the following:

a. WmCreateStdWindow ( ) which creates the actual map secondary window. Enter for this function any parameters that are needed, such as sizability, minimizability, etc. Refer to Volume 1, pages 54–75 of the mentioned OS/2 Manual.

b. Create Presentation Manager (PM) controls that are needed in the window, such as the scroll buttons, spin buttons, and any needed text. To create a button, use the WC_BUTTON message. Number the buttons starting in the upper left corner and circulating clockwise (for aid in correspondence later in step V). To create an entry field (for typing), use the WC_ENTRYFIELD message. Refer to Volume 1, page 96 of aforementioned reference. For each of the controls, determine the location of these controls with respect to a percentage placement in the secondary window (for example, 5% horizontally off the x axis and 10% vertically off the y axis . . . ).

c. Create the child window in which the map will reside. This is the small display window within the overall map window in which the reduced size representation of the overall object will reside. This will also be the control element display window's access point that will be used later to create a PS (Presentation Space) to draw the reduced size version of the work object. Refer to Volume 1, pages 393–401 of aforementioned reference.

d. "Subclass" the frame parameter to monitor for WM_ADJUSTWINDOWPOS messages which will, if such a message is received, post a WM_USER message to the MapWindow. The WM_USER message will go on a system queue, and once received, will be processed (see next section). By "subclassing", the MapWindow will receive all messages that are sent to the frame window first. If desired, the MapWindow can intercept messages, or, as in the presently described case, can cause another message to be sent to another destination (map control in this case), and then pass on the message to the work object's frame window for normal processing.

II. The following determines what the map control element does when it detects a WM_USER message:
1. Process the WM_USER message
   a. Query the parent swp (pointer to the information structure) by WinQueryWindowPos (access point mentioned above of parent window, swp). This will tell the controller the location and size of the parent window. Refer to Volume 2, page 332.
   b. Query the child swp (pointer to the information structure) by WmQueryWindowPos (access point of the child window, swp). This will tell the controller the location and size of the child window, allowing the controller to compare the position of the map window to the overall size of the work object. Refer to Volume 2, page 332.
   c. Draw the map relationship: call WM_MAPDRAW with the child swp information (received in step b).

III. MAPDRAW ( ): The following determines how to draw the control element scroll map once all information is received in WM_User message:
1. Create a PS (Presentation space) by GPICreatePS (window access point defined in I.1.c). Refer to Volume 1, pages 391–425. Refer to Volume 2, pages 55–57.
2. Modify the PS with GPISetPageViewport ( ) to enable calling within the map window. By doing this, when any program draws within the window, the entire object desired will be scaled to fit within the map window's defined area for the small map representation of the entire work object. Refer to Volume 2, pages 196–197.
3. Now that the PS is ready, send the program procedure on which the map is defined the message WM_DRAWMAP with the above PS. It is up to the user to draw the object using that PS. This is the same procedure for drawing the object as would be used when receiving the WM_Paint message. The benefit of using the PS and telling the user to create the object is that it will redraw the object rescaled so that it fits within the given area within the map window. It will also provide all emphasis states, such as selection, cursor, etc. For efficiency and speed, the program should draw the object using less detail than for the original view (if an increase in speed performance is desired).
4. Wait until the child window's user program finishes drawing in the PS.
5. Draw a box in the PS that will represent the parent window frame within the child window. This box represents the current view on the child work object and shows where the current view on the screen resides on the child object. To draw the box, use the GPIDrawLine ( ) call using the swp coordinates of the parent window with respect to the child window. See II.1.a and II.1.b. The user must assure that the lines are drawn with the GPISetCP set to ExclusiveOr. See Volume 1, page 178.
6. Close the PS. See all PS references.

IV. The following specifies what each user's program must do to use the scroll map:
1. Call MapRegister (hab, frame, owner) (see step 1).
2. Add to user code the code to signify WM_MAPDRAW (in other words, be aware and respond to the message).
3. When a WM_MAPDRAW is received, draw the child object in the given presentation space.

V. The following messages must be responded to in the Procedure defined for the MapWindow:
1. How to invoke a button in the MapWindow to control scrolling the parent window:
   a. Trap the WM_COMMAND message, and detect when the lower half of mp2 is equal to the CMDSRC_PUSHBUTTON. When it is equal, check to see which pushbutton was selected. (Refer to Volume 2, pages 424–425). When the preferred embodiment shown was created, the MapWindow was instructed to number the buttons as follows:
      1. Left corner of display control element window
      2. Top center (of element window)
      3. Top right corner
      4. Center right margin
      5. Bottom right corner
      6. Bottom center
      7. Bottom left
      8. Left center margin.
   For references to the following: WM_VSCROLL see Volume 2, page 466; WM_HSCROLL see Volume 2, page 439.
   When the button 1 is selected, send a WM_VSCROLL, message to the parent window with the sPos set to SB_LINEUP. Then send the parent window a WM_HSCROLL, message with the sPos set to SB_LINELEFT.
   When the button 2 is selected, send a WM_VSCROLL message to the parent window with the sPos set to SB_LINEUP.
   When the button 3 is selected, send a WM_VSCROLL message to the parent window with the sPos set to SM_LINEUP. Then send the parent window a WM_HSCROLL, message with the sPos set to SB_LINERIGHT.
   When the button 4 is selected, send a WM_HSCROLL message to the parent window with the sPos set to SB_LINERIGHT.
   When the button 5 is selected, send a WM_VSCROLL message to the parent window with the sPos set to SB-LINEDOWN. Then send the parent window a WM_HSCROLL message with the sPos set to SB_LINERIGHT.
   When the button 6 is selected, send a WM_VSCROLL message to the parent window with the sPos set to SB_LINEDOWN.
   When the button 7 is selected, send a WM_VSCROLL message to the parent window with the sPos set to SB_LINEDOWN. Then send the parent window a WM_HSCROLL, message with the sPos set to SB_LINELEFT.
   When the button 8 is selected, send a WM_HSCROLL, message to the parent window with the sPos set to SB_LINELEFT.
   b. Trap the WM_COMMAND message to check for spin button behavior, through the CMDSRC_SPINUP. CMDSRC_SPINDOWN, and CMDSRC_SPINCHANGED Once the page has been changed, calculate the new location of the control element display and work area display views in the following manner:
   Set the right border of the parent window to be PX.
   Set the right border of the child window to be CX.
   Set the top border of the parent window to be PY.
   Set the top border of the child window to be CY.
   The spin button is queried for the current value in the horizontal direction (let's call it H) and in the vertical direction (let's call it V).

The origin of the new parent window is now located at:
((H/(CX/PX)* child's largest x [usually 100]),
(V/(CY/PY)* child's largest y [usually 100])).

To set the child window to that location, call the message WinSetWindowPos and give it the above coordinates as the new coordinates. This causes the parent window to be scrolled to that new location and it causes the child to send a WM_ADJUSTWINDOWPOS message to the parent. The parent in turn passes the message through to the MapWindow control code (as described above) which up dates the map and then scrolls the window.

c. Trap for WM_BUTTON1DOWN messages [refer to volume 2, page 419]. When received, perform the above step in spin buttons with the WM_BUTTON1DOWN coordinates as (H, V) in the above equation, and follow from the equation to the next step.

d. Trap for WM_BUTTON2DOWN messages [Refer to Volume 2, page 420]. When received, check for WM_MOUSEMOVE [refer to Volume 2, page 444]. Once received, check for the coordinates received to be within the coordinates of the parent on the child (within the box representative of the window open on the child object). If the check is successful, check to see if WM_BUTTON2UP is present. If not, use the coordinates of the current mouse position as (H, V) in the above equation, and follow from the equation.

After registration, the window managing program creates a standard window which creates the actual map element secondary window.

Figure 6:
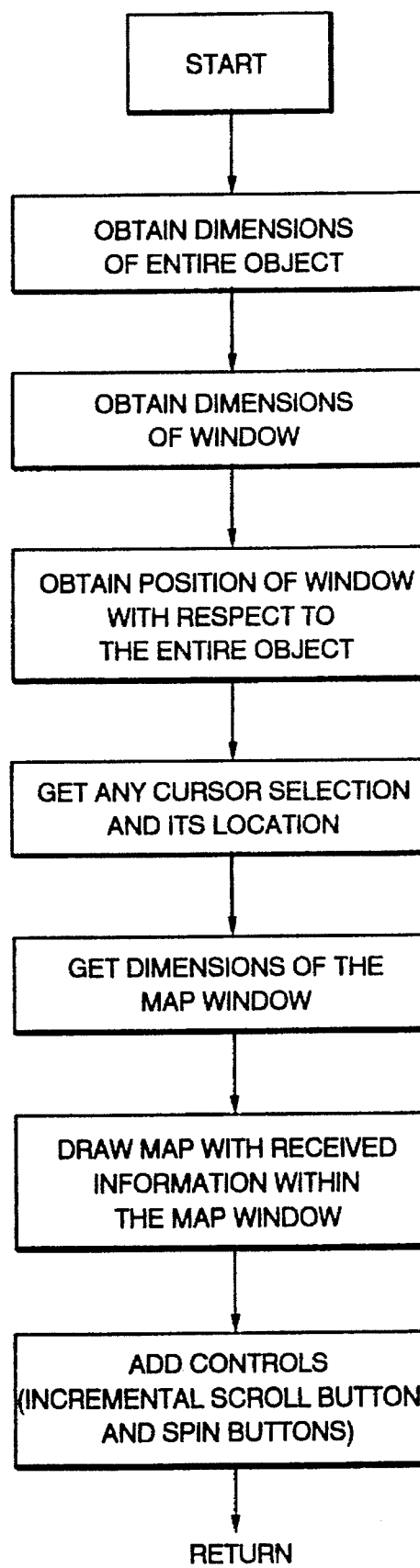

FIG. 6 illustrates the overall operation for updating the map control element whenever a change occurs either in the work object view area or within the control element map area, since the two views are linked together via the windowing control system and share the messages that passed back and forth in shown in FIG. 8 between portions labelled 8D and 8E.

Figure 5:
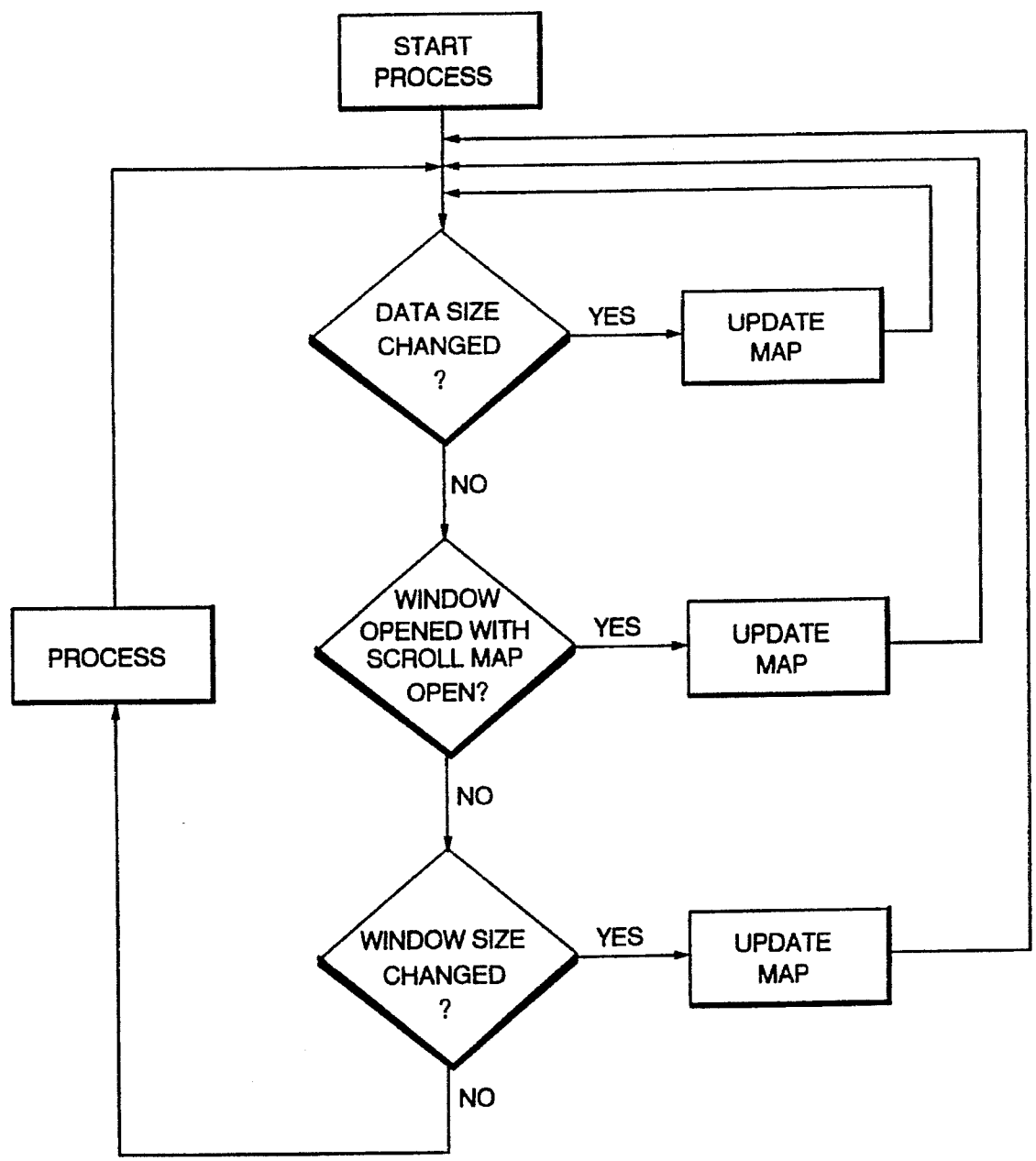
FIG. 5 is a flow chart for creating and controlling the display and positioning of a user's work area in it and for maintaining the scrolling map element control area in correspondence with any changes in the user's work window or FIG. 6 illustrates a process or creating the control element map area for scroll control or the like as utilized in the preferred embodiment.

FIG. 5 illustrates the process of determining where the map area element needs to be updated or changed as new selections for positioning or scrolling of the viewing window are made.

It will be appreciated that what has been demonstrated as the preferred embodiment includes a greatly improved scroll controlling element and mechanism in the form of the small map control window replacing the existing scroll control bars in the prior art with a direct, representational, geometrically similar, reduced size schematic of the overall work object, the viewing window area relative to the work object in size and position, and improved scrolling control elements enabled by the creation of the control button areas within the control element map window and by the ability for the system to detect dragging or moving of the view area representation within the display window of the control element.

All of these functions are easily facilitated utilizing existing windowing display control programs in normal computer display systems as have been described for the preferred embodiment herein. Therefore, it will be apparent to those skilled in the field that numerous variations in the size and position of the map display control window field and/or the invocation of other functions from within the map window may be easily accomplished.

Therefore, what is regarded as the invention and is desired to be protected by Letters Patent is set forth in the claims as follows by way of example only and not of limitation.

What is claimed is:

1. In a computer display control system, having means for presenting within a first area of a display screen at least a portion of a work object, said work object having overall dimensions larger than said display screen, control means for controlling which portions of said work object are displayed in said first area of said display screen, comprising:

means for presenting simultaneously with said display of said portion of said work object, a second display of data in a second area of said display screen, said second display of data comprising a reduced size representation of the overall relative dimensions of said work object and the placement of said first display area relative to the overall dimensions of said work object; and means for controlling the portion of said work object presented in said first display area of said display screen in response to changes in the relative positioning of said representation of said first display area and said representation of said overall dimensions of said work object in said second display area.

2. Apparatus as described in claim 1, further comprising:

means for displaying in said second display area at least one control function indicator area.

3. Apparatus as described in claim 1 or claim 2, wherein:

said means for controlling the portion of said work object presented in said first area is responsive to a selection in said second display area of at least one said control function indicator area.

4. A method of operating a computer display system having a computer and a display element in a manner to control the portion of a work object viewable on the display element of said system, comprising steps of:

displaying in a first window area of said display at least a portion of said work object for review and/or operation thereon;

displaying simultaneously in a second area of said display element a presentation of a reduced size representation of the overall relative dimensions and placement of said first area of said display relative to the overall dimensions of said work object; and controlling the portion of said work object presented in said first display area step in response to changes in the relative positioning of said representation of said first display area and said representation of said work object in said second display area of said display.

5. A method as described in claim 4, wherein:

said displaying step further comprises a step of displaying at least one control function indicator area within said second display area.

6. A method as described in claim 5, wherein:

said controlling step further comprises controlling the portion of said work object presented in said first display area in response to the selection in said second display area of said at least one control function indicator area.

7. In a computer display system having a display means and a computer controlling said display means, a method of controlling incrementation on said display means of a field of data from an array of data which array, if fully displayed, would be physically of greater extent than may be displayed within the confines of the available display area on said display means, comprising steps in said system of:

a first step of displaying in a first area on said display means a said field of data comprising a portion of said data from said array;

a second displaying step in a second area on said display means of displaying a reduced size geometrically similar representation of said first area; and a third displaying step of displaying simultaneously with said first and second step and in said second area, a physically reduced size outline representation of the overall outline extent of said array of data, said representation of said first area being contained within the borders of said outline representation; and controlling the placement of said first area representation within said outline representation; and controlling the said portion of said array of data displayed in said first area in response to the placement of said first area representation within said outline representation in said second area.

8. A method as described in claim 7, further comprising:

a step of displaying in said second area at least one identifiable subarea having a direction of motion indicator; and controlling the said portion of said array of data displayed in said first area of said display in response to the selection of said identifiable subarea by translating the portion of said array displayed in said first area in the direction indicated by said direction of motion indicator in said selected identified subarea of said second area.

9. A method as described in claim 2, further comprising:

said displaying includes displaying a plurality of said identifiable subareas, each of which is provided with a different direction of motion indicator.

10. Computer display control means, comprising:

means for displaying in a first area on a computer display a field of data comprising a portion of data from an array of data which, if made fully visible, would be of physically greater extent than may be displayed within said first area;

means for displaying in a second area in said display a reduced size, geometrically similar representation of said first area of said display together with said field of data, said field of data being reduced in size and displayed within said representation of said first area;

means for displaying simultaneously in said second area of said display a physically reduced size outline representation of the overall extent of said army of data, said outline representation of said army of data containing said representation of said first area within its borders; and controlling the placement of said first area of representation within said outline representation; and controlling the portion of said array of data displayed in said first area in response to the movement of said first area representation within the said outline representation in said second area.

11. A computer display system as described in claim 10, further comprising:

means for displaying in said second area at least one identifiable subarea having a direction of motion indicator represented thereon; and controlling the said portion of said array of data displayed in said first area of said display in response to the selection of said identifiable subarea by moving the portion of said array of data displayed in said first area in the direction indicated by said direction of motion indicator on said selected identifiable subarea.

12. A computer display system as described in claim 11, further comprising:

means for displaying in said second area a plurality of said identifiable subareas, each of which is provided with a different function or direction of motion indicator.

* * * * *